Patented June 28, 1932

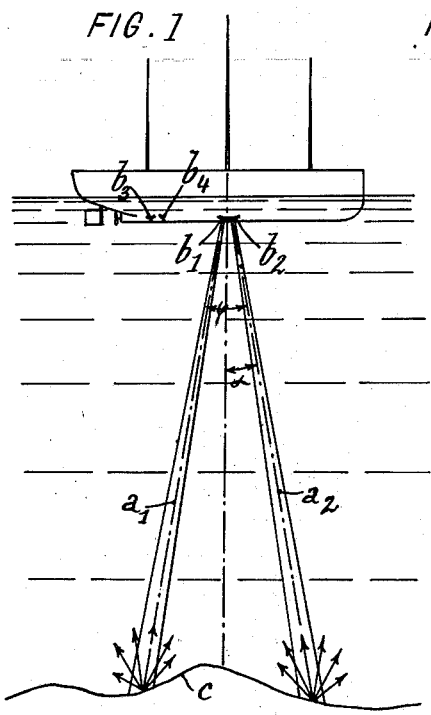
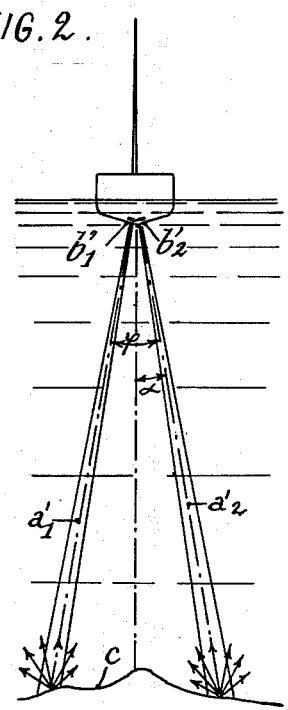
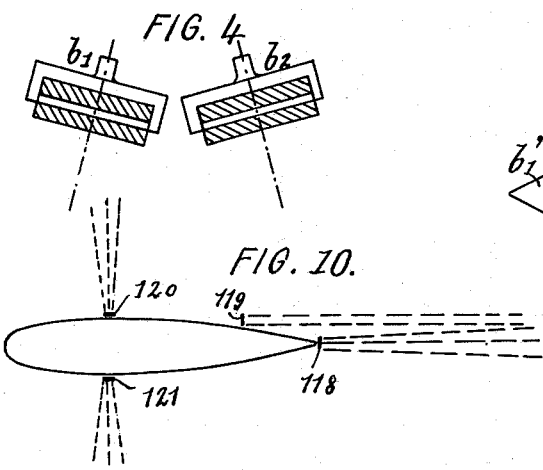
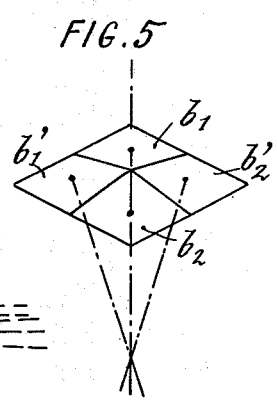

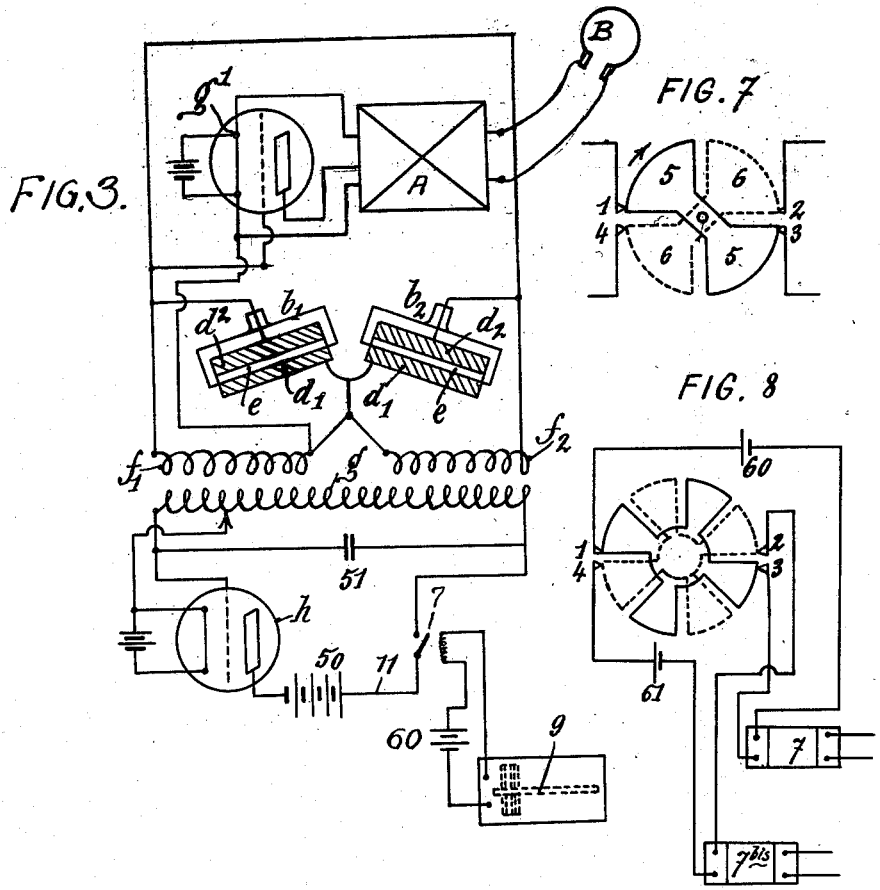

1,864,638

UNITED STATES PATENT OFFICE

CONSTANTIN CHILOWSKY, OF PARIS, FRANCE

METHOD AND MEANS FOR THE OBSERVATION AND MEASUREMENT OF THE SPEED OF A VESSEL BY DIRECTED BEAMS OF ULTRA-AUDIBLE WAVES

Application filed December 13, 1924, Serial No. 755,702, and in Belgium January 19, 1924.

The known means for observing the speed of a vessel in the open sea with any degree of accuracy are of an imperfect nature. The major part of these means, such as logs, measuring apparatus mounted upon the vessel and the like, can only be employed with difficulty in the case of a rough sea and in stormy weather, and cannot serve as a basis for the exact steering of the vessel or for making out its course. On the other hand, astronomical observations are often impossible to carry out, and the radio-goniometer method is often lacking in precision, so that it becomes difficult to steer the vessel in the open sea, in these conditions.

The present invention offers a solution of the problem of measurement of the vessel's speed with respect to the sea bottom or to the masses of water in the sea with a great accuracy and irrespectively of the state of the sea, this accuracy being sufficient to determine the course by this means alone.

The invention makes use of the method and means for transmission in the water of directed ultra-audible waves as described in the U. S. Letters Patent of Chilowsky and Langevin No. 1,471,547 and in the Langevin U. S. patent application Serial No. 390,542 filed June 21, 1920, enabling the location of submarine obstacles as well as the sounding of the sea bottom by observing the reflecting waves.

Further, the U. S. Letter Patent of Chilowsky and Langevin No. 1,471,547 chiefly specifies the feasibility of observing the relative motion of the obstacle and the observation point by the use of the Döppler principle, i. e. the change of frequency due to the motion of the obstacle relative to the observer.

The method employed in the present invention consists essentially in the transmission of one or more beams of ultra-audible waves, preferably to the bottom of the sea and in an oblique direction, that is to say at a certain angle with the vertical, and in the observation and measurement of the changes of frequency produced, (on the Döppler principle) in the beam or beams reflected from the sea bottom or from the mass of water of the sea, thus enabling the calculation of the vessel's speed in the direction or directions situated in the vertical planes wherein the said beam or beams are transmitted. It is important to observe that, as experience shows, the sea bottom as well as the major part of marine obstacles will reflect the ultra-audible waves, not according to the laws of reflection from polished mirrors, but after the manner of unpolished and irregular bodies. The energy of the beam is thus reflected in a diffused manner and somewhat in all directions, so that a portion of the reflected energy will always return to the vessel, even with use of oblique beams.

In clear weather, and in the absence of pitching and rolling of the vessel, a beam which is sent directly to the bottom of the sea either at the front or the rear of the vessel and in its longitudinal plane, or otherwise in a transverse plane, will be sufficient to indicate with a considerable accuracy the component of the vessel's speed in the forward direction in the first case, or the speed of its transverse displacement (or drift) in the second case. The resultant of these two speed components will give the actual speed with reference to the sea bottom in magnitude and direction. If the beam is sent obliquely in the forward direction, the wave reflected from the bottom, returning to the vessel and received by the receiving apparatus, will have a higher frequency, and the difference $n$ between the frequency of transmission $N$ and the frequency of receiving $N_2$ will be $$n = 2N \frac{v_1}{V} \sin a$$

in which $v_1$ is the horizontal speed of the vessel with respect to the sea bottom and in the lengthwise direction, $V$ the speed of travel, of the sound in water, $a$, the angle between the direction of transmission of the beam and the vertical. Abstraction is made of the small correction for angle which is due to the displacement of the vessel during the time taken for the forward and return motion of the wave, and supposing that the vessel's speed $v_1$ is small with reference to the speed, of the sound V. Small corrections due to mirages are also neglected.

By measuring $n$, one obtains the speed $$v_1 = \frac{nV}{2N \sin a}$$

$n$ is also the number of beats per second between the transmitted electric oscillations and the electric oscillations produced by the waves in the receivers after their reflection and their return to the vessel. To obtain such beats, an independent oscillating circuit comprising, for instance, a three-electrode lamp, having the same frequency as the transmission circuit, is caused to act by induction in the known manner upon the receiving circuit. The frequency of this independent circuit may also be different from the frequency of the transmitting circuit, but it should have a constant value, and in this event a constant is to be added to the value of $n$.

After obtaining the beats which characterize the speed, these must be measured. The very simple method which would consist in directly comparing the frequency of the said beats with a musical frequency, variable at will, would be inaccurate in rough seas as soon as the pitching or rolling angle becomes appreciable, for if the angle $a$ varies by a small angle $x$, $n$ will then become:

$$n = \frac{2Nv_1}{V} \sin (n+x)$$

which for a pitching angle of only 1° would give an error of nearly 9%
$(x+a=11°. \ a=10°)$ This drawback can be obviated by supplying the transmitter with electric oscillations whose frequency is variable with the momentary angle of pitching or rolling, and in such manner that for a constant speed of the vessel, $n$ will remain constant, i. e. for example the increase in frequency of the reflected waves due to an increased pitching angle shall be compensated by an equivalent reduction in frequency of the transmitted waves, and vice-versa (admitting that the beam is transmitted in front of the vessel).

These conditions can be had by a suitable variation of the capacity of the transmitting circuit, by adding to the constant capacity $C$ of the transmitter a variable capacity $C_1$ which is varied in an adequate manner according to the pitching or rolling angle.

Let $s$ be a constant having the value $$s = \frac{(v_1)^2}{n} \frac{1}{\pi^2 v^2 L}$$

in which $L$ is the self-induction of the oscillating circuit. One can obtain the desired result if the small variable capacity ($C_1$) which is connected in parallel upon the transmitter varies with the pitching angle $x$ according to the formula $C_1 = S \sin^2 (a+x) - C$.

For this purpose a variable condenser is employed whereof one coating is secured to the rotating part of a gyroscope device to be further described and the other coating to the part which is secured to the vessel and participates in pitching or rolling motion. The plates $m'$ and $m''$ of the variable capacity are so shaped that their capacity $C_1$ will correspond to the above mentioned formula when they are displaced with reference to each other by the pitching or rolling action.

But another important modification of the process according to the invention permits of obviating the drawbacks due to the pitching and rolling of the vessel. This modification consists in the oblique and simultaneous transmission to the sea bottom of two ultra-audible directed beams, which are symmetrically disposed with reference to the vertical either in the longitudinal or the transverse plane of the vessel, or in both planes at the same time.

When these two beams are employed, the two resulting beams reflected from the sea bottom are caused to interfere with each other, and not as before with a source of constant frequency such for instance as the transmitted beam. The sea bottom sends back the waves diffused in all directions, but for the sake of clearness, there will be considered only the waves received by the receiving apparatus, and this portion of the diffused waves will be called the reflected beam. The beam produced by the reflection of one of the said beams, the one for instance which is sent obliquely towards the sea bottom in the direction of travel of the vessel, will produce a reflected beam which returns at an increased frequency. The second beam which is directed symmetrically and obliquely towards the bottom, but in the contrary direction to the vessel's motion, will produce a beam which is reflected at a diminished frequency. The difference between the frequencies perceived as beats in the receiver is the algebraic sum of the two differences in frequency with respect to the frequency of transmission.

But the great advantage of the system of the two beams consists in the fact that the number of beats produced by the combined action of the two reflected beams resulting from the two transmitted beams is for the major part independent of the pitching and rolling and will thus offer sufficiently accurate measurements of the vessel's speed even in rough seas, and when used with certain precautions—during the most violent tempests.

In fact, when under the action of the pitching and rolling, the angle $a$ between one of the said beams and the vertical increases as far as $(a+x)$, $x$ being the relatively small pitching angle, the angle between the second beam and the vertical will diminish to $(a-x)$, and the sum of the sines will remain almost constant, since the two variations take place in the contrary direction and are for the greater part mutually compensated.

Let $\alpha$ be the constant angle between the two beams, $a=\frac{\alpha}{2}$ the constant angle between each of the said beams and the vertical which is supposed to pertain to the vessel, and $x$ the instantaneous value of the pitching angle at the moment of the transmission of the waves, and preserving the preceding designations, one will obtain for the difference in frequency or the number $n_1$ of beats due to the interference of the two reflected waves the value $$n_1 = \frac{4Nv_1}{V} \sin a \cos x.$$

So that the frequency of the beats will vary with the cosine of the pitching or rolling angle, or in fact very little. Thus 1° of pitching will cause an error of 0.00015, and an angle of 8° will cause a maximum error somewhat below 1%. Numerical example:—

Let $a=10°$, $N=100,000$ periods per second, $v_1=10$ metres per second, $x=0$, the speed of the sound in the water in round numbers 1,500 metres per second, $n_1=463$ beats per second. If $a=20°$, $b_1=913$ beats per second.

The beats are measured, as above specified, by any suitable means, and for instance by comparison with a musical frequency which can be varied at will.

The pitching angle of 8° giving an error of 1%, which is admissible in most cases, corresponds, at least for a large vessel, to a very rough sea. When observing the lateral speed of the vessel with two apparatus disposed in the transverse plane, the rolling angle may often exceed 8° and may attain 20° or even more, which would occasion a prejudicial error of 6%.

A modification of the method is provided in which the beam or beams are not reflected from the sea bottom but from the mass of water adjacent the vessel; the water, and chiefly that which is near the surface, possesses a certain (acoustic) opacity and affords a partial reflection of the ultra-audible energy. In fact, experience shows the existence of an echo (or reflection) of a diffused nature and short duration immediately after the transmission has ceased.

In the case of reflection of the ultra-audible beams obliquely or even horizontally by the mass of water, the change of frequency of the wave thus reflected will enable the calculation and control of the vessel's speed in relation to the liquid mass of the sea, and in many cases this will suffice for the steering of the vessel.

The following description relative to the appended drawings which are given by way of example shows various embodiments of the said invention.

Fig. 1 is a diagrammatic view of a vessel transmitting the ultra-audible beams $a_1$ $a_2$ in the longitudinal plan of the vessel. Fig. 2 is a section of the vessel transmitting two beams in a transverse plane. Figs. 3 and 4 represent two possible variations of the mutual inclination of the emission surfaces of the transmitters. Fig. 5 shows a possible juxtaposition of two pairs of transmitters. Fig. 6 shows a gyroscope apparatus providing for the closing of an electric contact during the time in which the vessel passes through the position of equilibrium. Fig. 7 shows a disc of the rotatable contact device which ensures the adaptation of the duration of the transmitting and receiving contacts to the depth of the sea bottom. Fig. 8 represents another disc of the contact device comprising eight metallic segments. Fig. 9 is an elevational view of the said contact device. Fig. 10 shows a possible arrangement of the transmitters upon the vessel (as a plan view) in case of reflection from the mass of water.

The transmitting apparatus, for instance of the type described in the Langevin patent application Serial No. 390,542—or any other apparatus producing directed ultra-audible waves—may be disposed upon the vessel either in the fixed position, or in such manner as to be movable on a vertical or a horizontal axis. A complete installation with stationary apparatus comprises four apparatus, i. e. two in which the waves are transmitted in the longitudinal plane of the vessel and two in which the waves are transmitted in the transverse plane, Figs. 1 and 2. Obviously instead of employing two separate apparatus, one may employ a single one with two transmitting surfaces mutually inclined at a suitable angle.

In order to obtain exact measurements of speed, it is necessary to transmit two beams having the maximum convergence, that is to say, to employ very short wave-lengths and make use of transmitting apparatus of very large size. For example, I may employ surfaces having 50 centimetres diameter and frequencies of 100,000 to 150,000 in continuous oscillations. In this event, the standard angle between the two beams may vary within rather wide limits according to circumstances. But in practice, a small angle $\alpha$ may be employed, for example 20° or 40°, in order that the messages may be properly received; in the case of reflection by the mass of water, the beams may be either oblique or horizontal. At these small angles the same apparatus may be used in turn for the observation of the speed of the vessel and for the sounding, the inclined beam indicating for example the depth at a short distance in front of the vessel.

The two or four transmitting apparatus are preferably disposed in the same part of the vessel and close together in order that the pitching and rolling will not have a different effect upon the said apparatus.

As a rule, the transmitting apparatus, and particularly the quartz plate condensers described in the above mentioned Langevin patent, may also serve for the receiving of the reflected waves, at least if the angle between the two transmitting apparatus is not excessive and if the change of frequency in the reflected waves is not too great.

In Fig. 1, $a_1$ $a_2$ represent two beams which are transmitted obliquely to the sea bottom and are inclined in like manner at a certain angle, $a$ relative to the vertical; $b_1$, $b_2$ are the apparatus disposed in the vessel below the water line, and inclined with reference to each other at a fixed angle $\alpha=2a$. After being reflected from the bottom $c$ at two different places the said beams partially return to the vessel (which has meanwhile moved forward to a slight degree) and are received by the same apparatus $b_1$ $b_2$ or by other receiving apparatus $b_3$ $b_4$, Fig. 1, or even by a single separate receiver. Beats are produced in the receiving circuit whose frequency is proportional to the difference in the frequency of the two reflected beams, which latter are proportional to the speed of the vessel, as above set forth.

In Fig. 2, $a'_1$ and $a'_2$ represent the two beams which are transmitted obliquely in the transverse plane by the apparatus $b'_1$ and $b'_2$.

In Fig. 3, the two transmitting apparatus $b_1$ $b_2$, which serve optionally for receiving purposes, are shown in section. They consist in this example of two steel resonance plates $d_1$ $d_2$ provided with a dielectric plate consisting of a mosaic $e$ formed of piezo-electric quartz.

Fig. 4 shows another method for obtaining the inclination of the transmitting apparatus in which the apparatus are symmetrically inverted with reference to the preceding arrangement.

Fig. 5 is a perspective view of the four transmitting and receiving apparatus combined in a group. The condensers $b^1$ and $b^2$ transmit waves in the plane of symmetry of the vessel, and the condensers $b'_1$ $b'_2$ in the transverse plane.

Figure 6:
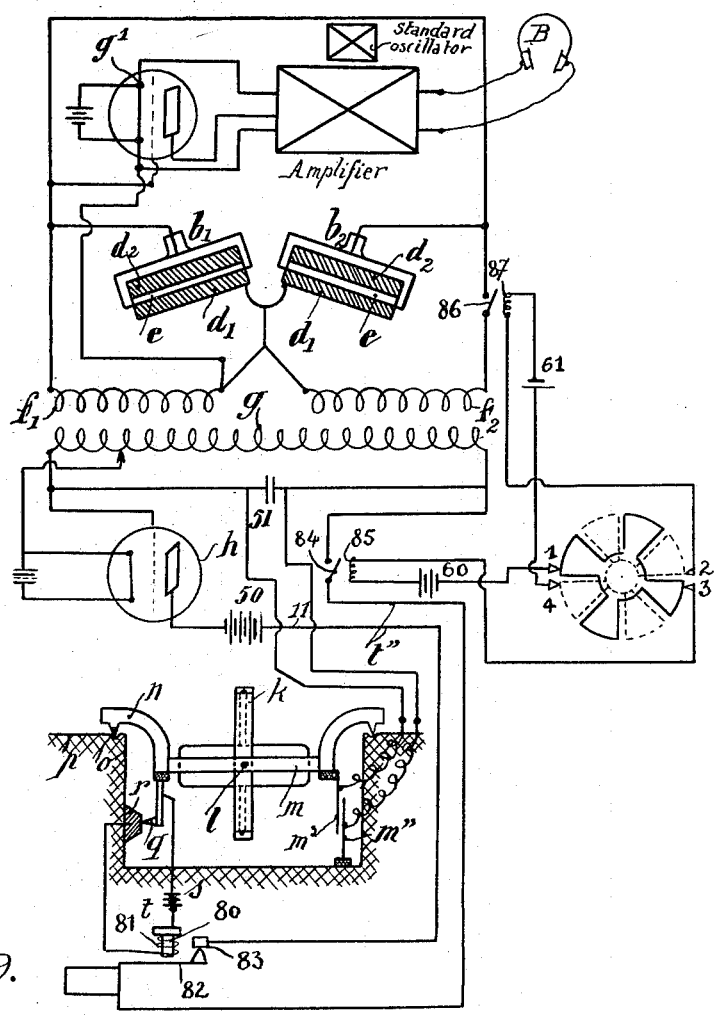

One arrangement which can be adopted for receiving the beats is shown in Fig. 3; the self-induction $f_1$ and $f_2$ form an oscillating circuit with the corresponding condensers $b_1$ $b_2$. These two circuits act either by induction, or directly, upon an amplifying device.

The oscillations are amplified by various lamps and are rectified by a detector lamp, and are then heard in a telephone B or like receiving apparatus.

Fig. 3 shows an arrangement of the transmission circuits, in which $h$ is a three-electrode lamp which produces high frequency oscillations and is supplied by a storage battery 50 or a continuous current generator. The oscillating circuit produced by the lamp in the self-induction $g$ and the capacity 51 connected to the same, acts by induction upon the self-inductions $f_1$ $f_2$ which are connected to the transmitting apparatus. The relay 7 disposed in the circuit of the battery 50 is controlled by a switching device 9 which will be further described with reference to Figs. 7 to 9 and which serves to break the circuit supplying the transmitter and to prepare the circuit for receiving the reflected waves. The lamp $h$ may also be supplied by the alternating current or by the current representing the musical waves, on the known principle, but a continuous current supply is preferable, in order to obviate the introduction of a prejudicial alternating frequency into the receiving circuit. The transmission circuit 11 is completed at $t''$, by the two wires $t''$ of the apparatus shown in Fig. 6, which is the gyroscopic apparatus adapted to close the circuit at the contact, in the case of pitching and rolling, only in the mean position of the vessel, and also to provide for varying the frequency of transmission if necessary.

The operation of the device shown in Fig. 3 is as follows:—

The lamp $h$ produces electric oscillations of a certain frequency in the coil $g$. These oscillations cause the transmission of ultra-audible waves by the condensers $b^1$ $b^2$. These ultra-audible waves are reflected from the sea bottom and act upon the apparatus $b^1$ $b^2$ which in this case operate as receivers and produce, in the circuits $f^1$ $f^2$ oscillations of different frequency. These oscillations are sent into the circuit of the lamp $g^1$ followed by the amplifier A, and cause beats by mutual action, which are perceived in the telephone B. To measure the frequency of these beats they are compared with a musical frequency which can be varied at will.

When this frequency is measured, the speed of the vessel is calculated as above specified. Or, on the other hand, the musical frequency apparatus is graduated directly in speeds, and shows the speed by direct reading, when the frequencies have been made equal.

Fig. 6 shows an arrangement of the transmission circuit which in part is substantially the same as disclosed with reference to Fig. 3. The only differences are the following: The direct connection between the battery 50 and the relay 7 is omitted and two wires $t''$ lead respectively from said battery and said relay to a gyroscopic apparatus, to be hereinafter described; the gyroscopic apparatus is adapted to close the circuit at the contact, in the case of pitching and rolling only in the mean position of the vessel and also to provide for varying the frequency of transmission if necessary. In the drawings $i$ is the disc or rotating part of a gyroscope which is actuated by electrical means—the driving device which is known per se is not shown—its shaft being secured to the frame $k$ which is movable upon the shaft $l$; the frame $m$ with its rigid arms $n$ is suspended by the knife edges $o$ from a foundation $p$ mounted upon the vessel. An electric contact $q$ secured to the frame $m$ co-operates with a stationary conductor $r$. The contacts $q$ and $r$ are placed in the circuit of a local battery $s$ which also includes the relay $t$, the latter is shown diagrammatically as comprising a core 80 adapted to be energized by a winding 81 of the circuit of said local battery $s$; as long as the contact is made at $(q, r)$, the core 80 being energized, attracts its armature 82; the latter cooperates with the contact 83. The straight line joining the said knife edges is disposed in the longitudinal plane of the vessel, and the gyroscope will remain in this plane, whilst the contact piece $r$ which moves with the vessel will participate in the rolling motion of the latter. Should the angle of this motion become excessive, the contact $q$ will leave the contact $r$, thus breaking the circuit of the relay $t$. Thus the core 80 is no longer energized, the armature 82 falls and the circuit comprising the leads $t''$ and supplying the transmission is broken. A like apparatus may be disposed in the transverse plane in order to close the circuit when the angle of the pitching becomes excessive. The relay $t$ acts by means of the circuit $t''$ upon the circuits of the contact device which will be further described. The frame $m$ of the gyroscope also carries a strip $m'$ which forms one plate of a condenser whose second plate $m''$ is secured to the part of the apparatus attached to the vessel. The condenser $m'$ $m''$ is a condenser which is variable according to the angle between the vessel and the frame $m$ of the gyroscope. This variable condenser is placed in the electric circuit $t''$ and hence will allow of varying the frequency of the transmission according to the inclination of the vessel, when this means is employed to correct the error due to pitching and rolling.

In the transmission circuit is inserted the armature 84 of a relay 7 having a control coil 85; the energizing circuit of the latter comprises a battery 60 and two contacts 1 and 3 adapted to be bridged through rotatable metallic segments, the operation of which will be hereinafter described with reference to Fig. 8. Similarly, the receiving circuit comprises the armature 86 of a relay 7bis having a control coil 87; the energizing circuit of the latter comprises a battery 61 and two contacts 2 and 4 adapted to be bridged through another set of rotatable metallic segments to be hereinafter described with reference to Fig. 7. The two sets of segments are so disposed with respect to one another that upon their being simultaneously rotated the contacts 1 and 3 on the one hand and the contacts 2 and 4 on the other hand are alternately electrically connected through their corresponding segments; thereby, the periods of transmission and of receiving are caused to succeed each other without being superposed.

Instead of effecting the mutual interference of the oscillations produced in the receiver by the condenser $b^1$ on the one hand and the condenser $b^2$ on the other hand, I may use only a single condenser $b^1$. The arrangement of circuits is analogous to the one shown in Fig. 3, but without the condenser $b^2$. In this case the oscillations produced at the receiving end by the condenser $b^1$ will produce oscillations in the circuit A, and these oscillations are caused to interfere with those of a standard oscillator such as a heterodyne lamp whose frequency is equal to the frequency of the transmission circuit $g$. This will produce beats which can be perceived in the listening device B, which beats are measured as in the preceding case.

Figure 9:
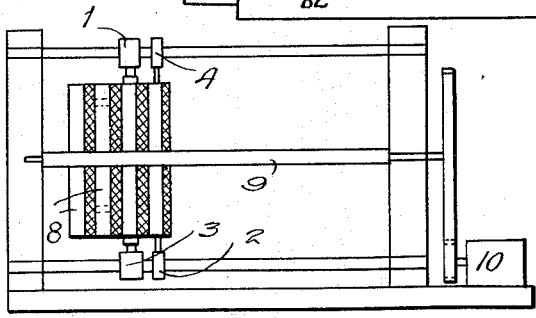

Figs. 7, 8 and 9 show the contact device which is used for the periodic opening and closing of the transmitting and receiving circuits when these are separate and distinct; said device comprises a shaft 9 which is for instance horizontal, it being driven by an electric motor 10 whose speed is variable at will by means of a suitable resistance. Upon the said shaft are keyed a plurality of discs 8, each provided with a different number of metallic segments, which number increases progressively, for example. The first disc, shown in Fig. 7, comprises for instance four metallic segments, 5—5, 6—6 and the second has eight segments, Fig. 8; the oppositely situated segments such as 5—5 are electrically connected together and are insulated from the adjacent segments. Four contact pieces 1, 2, 3, 4 are mounted in diametrically opposite position in pairs upon the periphery of one of the discs; the contact pieces 1 and 3 close the circuit of a battery 60 upon the relay 7 which controls the transmission circuit, Fig. 3; the contact pieces 2 and 4 act in like manner to close the circuit of a battery 61 upon the relay 7bis which controls the receiving circuits.

By reason of the respective positions of the metallic segments 5—5, 6—6 and the contacts 1, 3 on the one hand and 2, 4 on the other hand, the contacts 1 and 3 are alternately closed and opened, while inversely the contacts 2 and 4 are opened and closed, so that the periods of transmission and receiving will succeed each other without being superposed. The contacts 1, 2, 3, 4 may be slidable along the periphery of the discs which are mounted upon the shaft 9, so as to bring them upon discs having a greater or less number of segments, in order to lengthen or shorten the periods of transmission at will according to the depth of the sea bottom. One may also act upon the speed of the motor 10 according to the depth, so as to modify the said periods without changing the disc.

In the case in which the connections shown in Fig. 3 are employed, the transmitting and receiving circuits which are partially combined, the first receiving lamp $g'$ being connected to the self-inductions $f^1$ $f^2$, it will suffice to utilize the contacts 1 and 3, with the relay 7 opening and closing the transmitting circuit 11, as concerns the receiving circuit, it is unnecessary to provide in this latter the contacts 2 and 4 and a relay 7bis, since it is automatically in a condition to operate as soon as the transmission stops. In fact, during the transmission, the first lamp $g'$ of the receiving amplifier is saturated, so that it will remain silent during the periods of transmission without making it necessary to break the circuit.

A single horizontal beam of ultra-audible waves may be employed which is transmitted for instance from the front of the vessel. The waves may be transmitted in the shape of repeated strokes or "dashes" of very short duration, and the receiving may be carried out by the same apparatus, the above mentioned contact device providing for a suitable succession of transmissions of very short length. But the receiving may also be carried out with a separate receiver. The above mentioned means are employed to measure the beats of the beam reflected from the water and received in the receiving apparatus at a musical frequency which is variable at will. But the transmission and receiving may also be continuous in the case of a separate receiver disposed for instance at the rear and at a sufficient distance from the transmitter, but forwardly directed and well protected from induction effects. In this case, one may simply observe the beats which are produced between the waves reflected from the mass of the water and the frequency of the transmission proceeding directly from the water or resulting from the induction in the receiver. But it should be observed that a marked agitation of the water will diminish the sharpness of the beats in the case of horizontal beams.

The use of beams which are horizontal or slightly oblique to the horizon is advantageous from the fact that the angle of pitching and rolling will vary the frequency of the reflected beam, even in the case of a single beam, according to the law of the cosine of a small angle, so that it will suffice to employ one beam for the longitudinal speed and another for the transverse speed, the beats being produced between the beam reflected from the water and a constant musical frequency. However, it is also feasible to employ two beams which proceed in the contrary direction.

Since the thickness of the masses of water which participate effectively in a reflection which is still audible is only on the order of some hundreds of metres, the frequency of the emission can be much augmented and can herein attain some hundreds of thousands of oscillations per second, as the rapid absorption of the short wave-lengths by the water offers no great drawback. Two beams may also be employed which are directed obliquely upon the sea bottom, but observing only the waves reflected from the masses of water and not from the sea bottom, especially in a very deep sea.

By the use of a suitable arrangement of the said contact devices, one is enabled, in the case of waves directed upon the sea bottom, to cause the waves reflected from the water either to appear or to disappear. By using very high frequencies or lower frequencies, the reflected waves from the sea bottom can be made to appear or disappear. This provides a means for separately observing the speed of the vessel with respect to the water or to the sea bottom.

Fig. 10 shows the arrangement of apparatus on the vessel in the event of the utilization of beams which are horizontal and are reflected from the masses of water. 118 is a transmitter or a combined transmitter and receiver mounted at the front of the vessel; 119 is a separate receiver; 120 and 121 are two combined transmitters and receivers for observing the lateral speed. These may be used separately or on the interference principle for the receiving, or otherwise in combination with separate receivers.

In the case of a rough sea, one may employ either a horizontal beam, observing the beats of the beam reflected from the water, with an oscillation of constant frequency, or the beats produced by the reflected beams corresponding to two inversely directed horizontal beams, or further, even the beats produced by two horizontal beams at an angle of 90° with each other.

The said apparatus may also be utilized in a different manner. If the apparatus producing oblique or horizontal beams are movable about a vertical axis, the system can be directed by turning it upon the said axis, so as to cause the entire disappearance of the beats produced by the reflected waves coming from the apparatus disposed in the transverse plane, or should two frequencies which are close together be employed, the number of beats can be reduced to this constant difference in frequency. The direction perpendicular to this transverse plane will be the true direction of the vessel with respect to the bottom, and the beats of the reflected waves produced by the apparatus disposed in this longitudinal plane will show the veritable speed of the vessel, in value and direction. By operating the rudder of the vessel, the latter may be directed in such manner that the true direction will always coincide with the desired direction and that the vessel will cover the distance in the minimum time.

If the apparatus are stationary, the beats of the reflected waves of the beams situated in the transverse plane will indicate the speed of the lateral displacement of the vessel, and the rudder may be so turned as to exactly compensate for this component of speed (without causing the beats to disappear), so that the true speed of the vessel will coincide as to direction with the desired speed.

This observation of the speed which is performed with a sufficient accuracy will allow of considering a constant orientation of the vessel in the open sea, starting from the base of departure, and independently of astronomical observations. The method depending upon the reflection from the mass of water may be employed for exact measurements of marine currents, for observing the speed of rivers and for like purposes.

What I claim is:

1. A method for determining the speed of a vessel consisting in the emission in water of at least one beam of ultra-audible waves in a direction other than the vertical, and in the observation of the changes in frequency occurring according to Döppler's principle and by reason of the vessel's speed in the ultra-audible beam returning to the vessel after reflection upon a stationary obstacle and deducing the speed of the vessel from the changes of frequency observed.

2. A method for determining the speed of a vessel consisting in the emission in water of at least one beam of ultra-audible waves in a direction other than the vertical, and in the observation of the changes in frequency occurring according to Döppler's principle and by reason of the vessel's speed in the ultra-audible beam returning to the vessel after reflection from the sea bottom and deducing the speed of the vessel from the changes of frequency observed.

3. A method for determining the speed of a vessel consisting in the emission of two beams of ultra-audible waves obliquely towards the sea bottom in two symmetrical directions with reference to the vertical and in measuring the frequency of the beats produced by the interference of two beams reflected from the sea bottom, and deducing from the frequency of the beats the component of the vessel's speed in the plane of the two beams.

4. A method for determining the speed of a vessel consisting in the emission in water of two beams of ultra-audible waves which are directed obliquely towards the sea bottom in two symmetrical directions with reference to the vertical and in the longitudinal plane of the vessel, as well as two like beams directed in an analogous manner in a transverse plane perpendicular to the longitudinal plane in measuring the frequency of the beats produced by the interference of the two beams situated in the longitudinal plane which are reflected from the sea bottom and in measuring the frequency of the beats produced by the interference of the other two beams situated in the transverse plane which are reflected from the sea bottom, in such manner as to permit to deduce from the frequency of beats in each of the planes the two components of the vessel's speed in each of the said planes.

5. A method for determining the speed of a vessel consisting in the emission in water of at least one beam of ultra-audible waves in a direction other than the vertical, and in the observation of the changes in frequency occurring according to Döppler's principle and by reason of the vessel's speed in the ultra-audible beam returning to the vessel after reflection in each of said planes and in compensating the errors due to the pitching and rolling of the vessel by an automatic variation of the frequency of the emitted beam relative to the angle of pitching or rolling.

In testimony that I claim the foregoing as my invention, I have signed my name hereto.

CONSTANTIN CHILOWSKY.